US007120562B1

(12) United States Patent
Wilson

(10) Patent No.: US 7,120,562 B1
(45) Date of Patent: Oct. 10, 2006

(54) SIGNAL SOURCE IDENTIFICATION UTILIZING WAVELET-BASED SIGNAL PROCESSING AND ASSOCIATED METHOD

(75) Inventor: Amela Kreho Wilson, Plano, TX (US)

(73) Assignee: L-3 Integrated Systems Company, Greenville, TX (US)

(*) Notice: Subject to any disclaimer, the term of this patent is extended or adjusted under 35 U.S.C. 154(b) by 0 days.

(21) Appl. No.: 10/738,448

(22) Filed: Dec. 17, 2003

(51) Int. Cl.
*G06F 15/00* (2006.01)

(52) U.S. Cl. .................... 702/189; 361/115; 706/26

(58) Field of Classification Search ............ 702/74, 702/76, 182, 184, 189; 342/90, 417; 73/596; 706/26; 708/400; 361/115; 600/304, 546
See application file for complete search history.

(56) References Cited

U.S. PATENT DOCUMENTS

| 5,124,930 | A |   | 6/1992  | Nicolas et al. ........... 702/76  |
| 5,561,431 | A |   | 10/1996 | Peele et al. ............. 342/90  |
| 5,990,823 | A |   | 11/1999 | Peele et al. ............. 342/90  |
| 6,038,579 | A |   | 3/2000  | Sekine .................. 708/400  |
| 6,105,015 | A | * | 8/2000  | Nguyen et al. ........... 706/26  |
| 6,397,679 | B1 |  | 6/2002  | Sadok et al. ............ 73/596  |
| 6,411,914 | B1 |  | 6/2002  | Mack ................... 702/74   |
| 6,957,172 | B1 | * | 10/2005 | Wegerich ................ 702/189 |
| 2002/0140605 | A1 |   | 10/2002 | Kozlov et al. ........... 342/417 |
| 2004/0264094 | A1 | * | 12/2004 | Rahman et al. ........... 361/115 |

OTHER PUBLICATIONS

Rahman et al., U.S. Appl. No. 60/468,067, "Protective control method and apparatus for power devices", filed May 6, 2003.*

Rune Sundgot and Leiv Øyechaug; "Emitter Identification Methods in an ESM Demonstrator"; *FFI Report*, 2002/00555 (Translation).

Eirik Malnes et al.; "Specification of an ESM-Demonstrator"; *FFI Report*, 2000/06388 (Abstract Translation).

Ronald R. Coifman and Mladen Victor Wickerhauser; "Entropy-Based Algorithms for Best Basis Selection"; *IEEE Transactions On Information Theory*, vol. 38, No. 2, pp. 713-718; Mar. 1992.

FY 2001 RDT&E, N Budget Item Justification Sheet, Feb. 2000.

FY 2002 RDT&E, N Budget Item Justification Sheet, Jun. 2001.

Ingrid Daubechies; "Ten Lectures on Wavelets"; Society for Industrial and Applied Mathematics; Philadelphia, Pennsylvania; 1992.

* cited by examiner

*Primary Examiner*—Bryan Bui
*Assistant Examiner*—John Le
(74) *Attorney, Agent, or Firm*—O'Keefe, Egan & Peterman, LLP

(57) ABSTRACT

A signal source identification system and associated method are disclosed that utilize wavelet-based signal processing to facilitate signal source identification. In particular, the wavelet-based signal processing enables the extraction of fingerprint type signatures for signal sources using wavelet packet processing, and supplementary signal processing can be used to further enhance the accuracy of the system. This signal source identification system can be used for identifying signal sources within a received data signal, used for providing security features by verifying the identify of a transmitting device, and/or used in other environments where it is desirable to identify or differentiate among signal sources. Other features and variations can be implemented, if desired.

24 Claims, 9 Drawing Sheets

SIGNAL SOURCE IDENTIFICATION UTILIZING WAVELET-BASED SIGNAL PROCESSING AND ASSOCIATED METHOD

TECHNICAL FIELD OF THE INVENTION

This invention relates to techniques and architectures for identifying the source of a radiated signal and more particularly to signal processing of received signals to achieve signal source identification.

BACKGROUND

In certain environments it is advantageous to be able to identify the source of electromagnetic radiation that is received by a receiver system. For example, in one such environment, receivers acquire data signals from a plurality of transmitters or emitter sources, the identities of which may or may not be known. Prior techniques to identify signal sources have included analyzing acquired signals and processing them to separate them into individual signal streams that are believed to correspond to specific signal sources. After generating these individual signal streams, processing techniques have then attempted to identify the source of each signal stream. These existing algorithms for emitter or signal source identification, however, typically require high signal to noise ratio pulses, varying processing window lengths, and long pulse widths for accurate identification. It is desirable, therefore, to improve the performance of these prior signal source identification techniques.

SUMMARY OF THE INVENTION

The present invention is a signal source identification system and associated method that utilize wavelet-based signal processing to facilitate signal source identification. In particular, the wavelet-based signal processing enables the extraction of fingerprint type signatures for signal sources using wavelet packet processing, and supplementary signal processing can be used to further enhance the accuracy of the system. This signal source identification system can be used for identifying signal sources within a received data signal, used for providing security features by verifying the identify of a transmitting device, and/or used in other environments where it is desirable to identify or differentiate among signal sources. As described below, other features and variations can be implemented, if desired.

In one embodiment, the present invention is a method for identifying signal sources including determining phase differential data for a signal stream with the signal stream corresponding to signal data from a single signal source and applying wavelet packet processing to the phase differential data to generate a wavelet-based signature for the signal source. In addition, the method can include acquiring data signals including combined signal streams from a plurality of signal sources, pre-processing the data signals to separate the data signals into a plurality individual signal streams with each individual signal stream being deemed to have originated from a single signal source, and using one of the individual signal streams for the determining step. Still further, the method can include storing in a database wavelet-based signatures corresponding to known signal sources and comparing the signature for the signal source with the stored data to determine if the signature for the signal source matches wavelet-based signatures stored for known signal source. In addition, the method can include applying supplemental identification processing to the signal data to provide additional identification information for the signal stream. It is again noted that other features and variations can be implemented, if desired.

In another embodiment, the present invention is a signal source identification system including a phase pre-processing sub-system coupled to receive an individual signal stream and a wavelet-based signal processing sub-system coupled to receive phase differential data from the phase pre-processing sub-system. The phase pre-processing sub-system is configured to determine phase differential data for the individual signal stream, and the wavelet-based signal processing sub-system is configured to apply wavelet packet processing to generate a signature for the individual signal source. In addition, the signal source identification system can also include a data acquisition sub-system that receives an input signal that includes combined signal streams from a plurality of signal sources and a data pre-processing sub-system that separates the data signals into a plurality individual signal streams such that each individual signal stream is deemed to have originated from a single signal source. One of these individual signal streams can then be provided to the phase pre-processing sub-system. Still further, the signal source identification system can include a database having stored data representing wavelet-based signatures that correspond to known signal sources and a signal source identification sub-system coupled to receive the signature from the wavelet-based signal processing sub-system and to compare the signature with the stored data to determine if the individual signal source matches wavelet-based signatures of a known signal source. Furthermore, the signal source identification system can include a supplemental identification sub-system coupled to receive data from the wavelet-based signal processing sub-system and to provide additional identification information for the individual signal stream. As above, it is noted that other features and variations can be implemented, if desired.

DESCRIPTION OF THE DRAWINGS

It is noted that the appended drawings illustrate only exemplary embodiments of the invention and are, therefore, not to be considered limiting of its scope, for the invention may admit to other equally effective embodiments.

DETAILED DESCRIPTION OF THE INVENTION

The present invention facilitates signal source identification through the use of wavelet packet signal processing. In particular, the wavelet-based signal processing enables the extraction of fingerprint type signatures for signal sources. Descriptions of example system and method embodiments for the invention are described below.

The wavelet approach to source identification according to the present invention is a novel approach that facilitates the identification of sources of electromagnetic radiation, such as technologically evolving radio-frequency (RF) emitters. The wavelet-based algorithms discussed below are attempts to reduce the deficiencies of previous methods using wavelet-based processing and spectral coefficients that extracts useful identification features from signal pulses and that reduce identification errors. As discussed further below, wavelet packets decompose pulses into time-frequency bands to capture the uniqueness of a pulse transient response. The features obtained from decomposition can then be used for database matching and expansion. Other features can also be extracted from signal spectral coefficients and used for matching refinement in supplemental processing steps.

As also described in more detail below, the present invention provides a number of innovative features, including: the use of wavelet packets in extracting signal source features from pulses, the use of spectral coefficients jointly with wavelet packet decomposition to refine the matching/identification process, the extraction of the shape of wavelet packet coefficients, using the shape as a persistent and prominent signature, encoding the shape of wavelet packet coefficients into a binary representation that allows a form of data compression, and the selection of nodes from the fully decomposed wavelet packet tree that carry unique and relevant information for distinguishing signal sources. The example processing method described below performs the steps of decomposing the signal into time-frequency bins, selecting nodes from the wavelet packet tree that carry discriminative information, extracting and encoding the signal shape from the selected nodes, using these shapes as signatures for identification purposes, further extracting spectral coefficients, and using these extracted features for supplemental identification purposes. This unique identification system of the present invention provides significant advantages, including: increasing the robustness with respect to pulses having low signal-to-noise ratio (SNR), improving overall identification capabilities, and helping to remove the dependency on a variety of processing windows that can in turn lead to inconsistencies. And the present invention has applicability to space, air and land-based applications where signal source identification or discrimination is desired.

Figure 1:
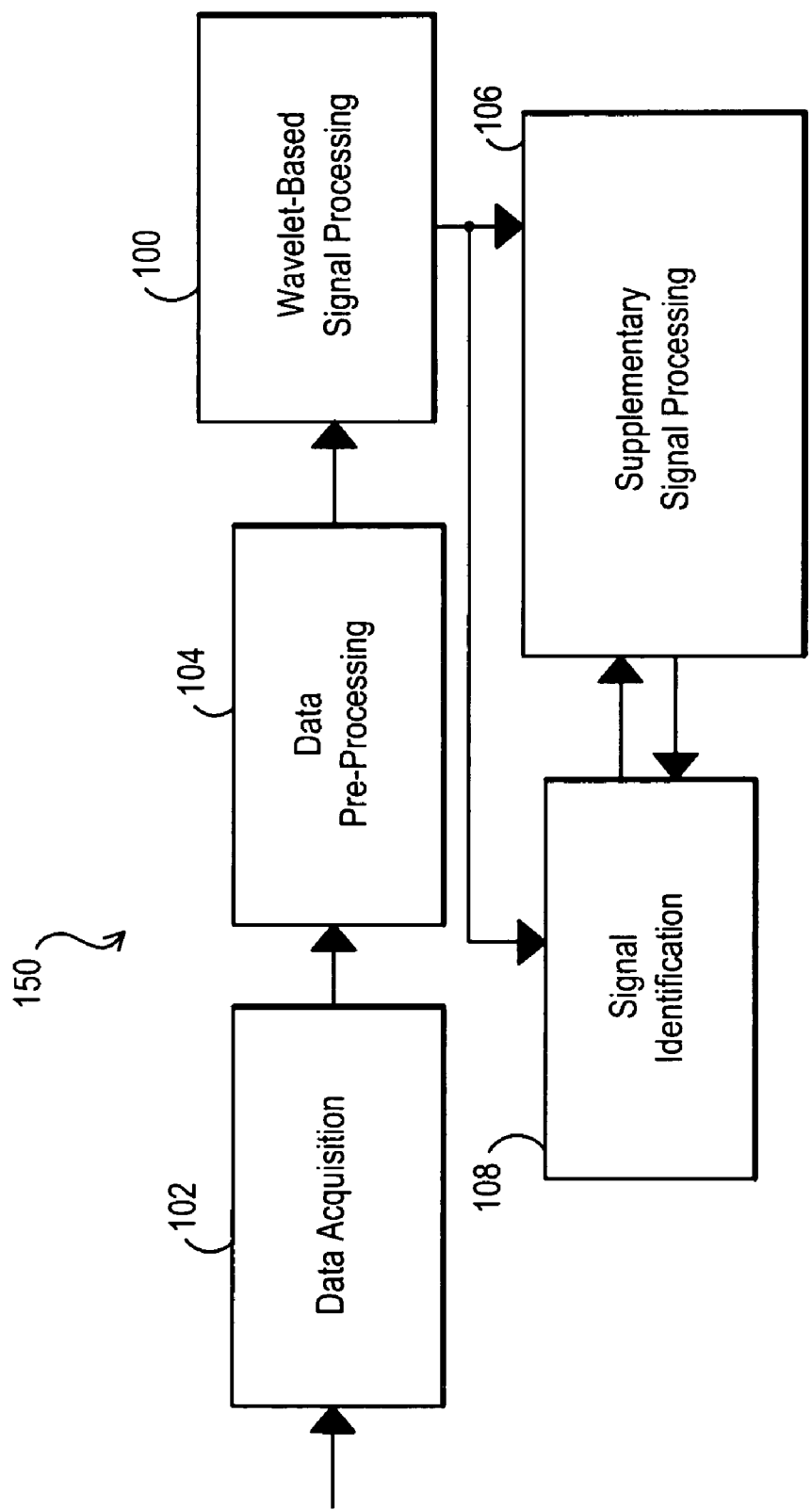
FIG. 1 is a block diagram for an example embodiment of a wavelet-based signal source identification system, according to the present invention.

FIG. 1 is a block diagram for an example embodiment of a wavelet-based signal source identification system 150, according to the present invention. The data acquisition block 102 represents hardware, software and/or related signal processing in which signal data is acquired, for example, electromagnetic radiation signals acquired by a receiver. The data pre-processing block 104 represents hardware, software and/or related signal processing that analyzes and processes the acquired signal data to try to de-interleave the data into separate data streams. For example, where combined signal data for a cell phone and a short wave radio are received by the data acquisition block 102, the pre-processing block 104 attempts to analyze the signal data to determine which signals are from the cell phone and which signals are from the short wave radio. The desired result of this pre-processing step is to pass separate signal streams to rest of the system, one signal stream for the cell phone transmitted signals and another signal stream for the short wave radio transmitted signals. The de-interleaved signal streams are then processed by the wavelet-based signal processing block 100. As described in more detail below, this processing block 100 processes one of the de-interleaved signal streams and decomposes it using wavelet processing to generate a wavelet signature for the signal stream.

This wavelet signature represents in effect a fingerprint for the transmitter that generated the signal stream, and it can be stored in a signature database for future comparison to other received signals. In the signal identification block 108, the wavelet signature determined for the analyzed signal stream can be compared against signatures stored in the database of transmitter information to determine if a match can be confirmed. For example, if the signal stream related to the cell phone were the one analyzed by the wavelet-based signal processing 100, a wavelet signature would result from the analysis of this block. If a signature for this cell phone has previously been stored in the signature database, a match for this cell phone could be confirmed in the comparison analysis provided by the signal identification block 108. If a match is not confirmed or multiple matches exist, additional processing can be done in the supplementary signal processing block 106 in an effort to determine further distinguishing features of the analyzed signal stream. For example, Fourier transform or watershed processing, as described further below, can be used for secondary identification processing, and this information can also be stored in a database for later use. Based upon this secondary identification information, a determination can again be made in the signal identification block 108 as to whether a match for the signal source has been made. If a match is determined, the identity of the transmitter can be provided as an output. If a match is not determined, the information for that signal source can be stored as a new transmitter in the database for future use in signal source identification. For example, if the cell phone above was previously unknown to the system, the wavelet signature from the wavelet-based signal processing block 100 and/or the secondary identification information from the supplementary signal processing block 106 can be stored for use in later identification processing, such as where signals from the cell phone are received and analyzed again in the future.

Figure 2A:
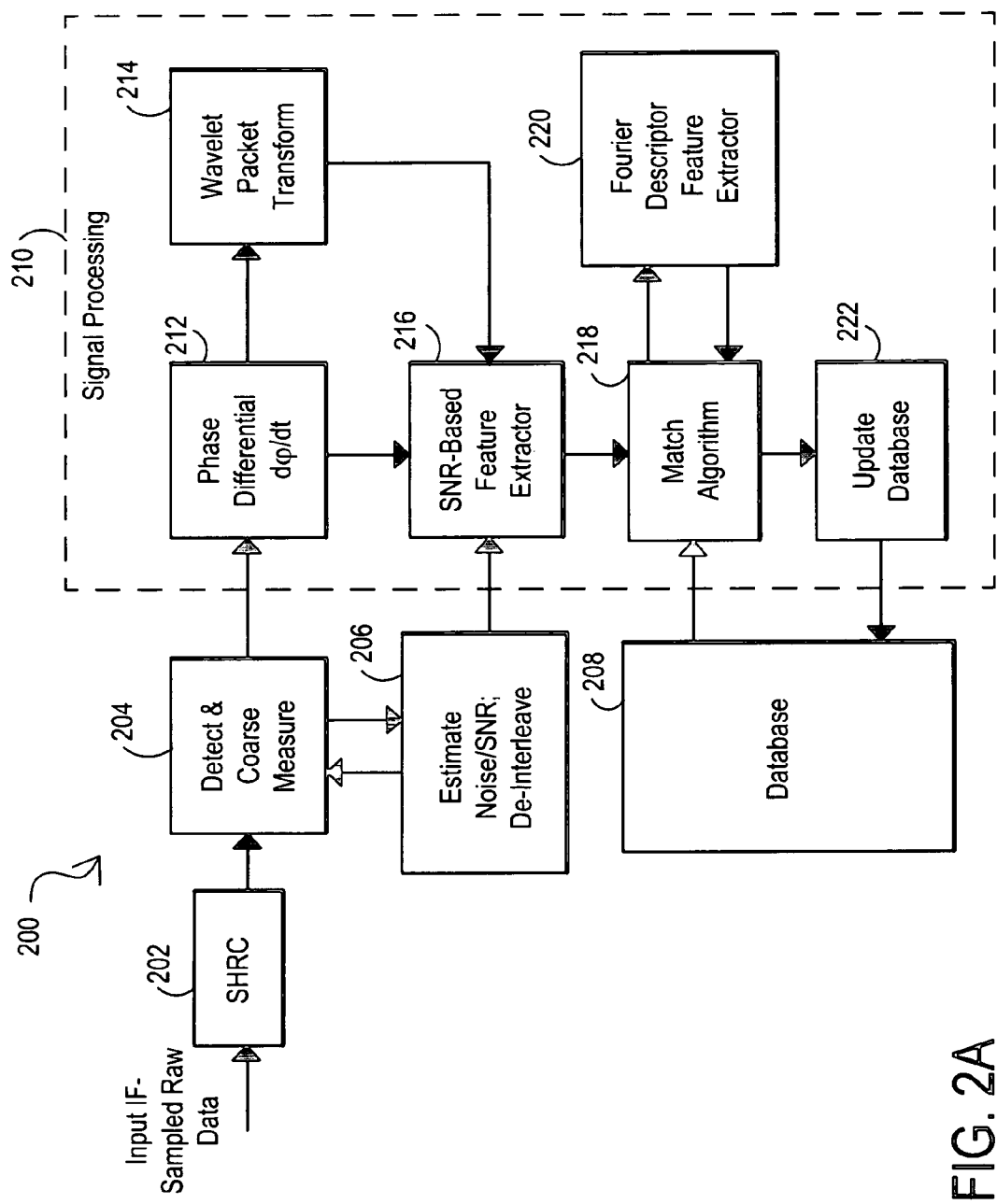
FIG. 2A is a block diagram for a more detailed example embodiment for a wavelet-based signal source identification system.

FIG. 2A is a block diagram for a more detailed example embodiment for a wavelet-based signal source identification system 200. This system 200 includes a signal processing block 210 that includes wavelet-based signal processing in block 214. In this example, the input to the sample-and-hold rate converter (SHRC) block 204 is sampled raw signal data that has been mixed down to a selected input IF (intermediate frequency) frequency. The output of the SHRC block 202 then goes to the detect and coarse measure block 204, in which the pulses in the signal stream are first detected and in which the signal strength is measured. An output from block 204 goes to block 212 where phase differential measurements (dφ/dt) are made. The wavelet packet transform block 214 uses the output from block 212 to accomplish wavelet processing, as described further below. The output from block 214 represents a wavelet signature determination. Block 204 also provides an output signal to block 206 where the noise or signal-to-noise ratio (SNR) of pulse data is estimated, and the signal pulses are de-interleaved, if needed. If data de-interleaving was needed, then the de-interleaved data is provided from block 206 to block 204.

The SNR-based feature extractor block 216 receives SNR estimation data from block 206, phase differential measurements from block 212, and wavelet packet transform signature data from block 204. Block 216 then extracts the features that are used in the match algorithm block 218. The match algorithm block 218 compares the extracted features with the information in the database 208 to determine if a match exists. The match algorithm block 218 can also communicate with a supplemental identification processing block, such as the Fourier descriptor feature extractor 220. This additional feature or signature information can be compared by the match algorithm with the data in database 208 to determine if a match exists. As described above, signature data for the analyzed signal stream can also be stored in database 208 through the update database block 222. For example, signature data related to unknown signal sources can be added to the database 208, or signature data related to known signal sources that is already stored in database 208 can be updated or modified, if desired.

This architecture of FIG. 2A, as depicted, consists of a primary block which is the signal processing block 210, and supporting blocks such as data rate converters 202, noise estimators 204 and 206, and a signal source database 208. The operation of the signal processing block 210 can be summarized as follows. After preprocessing the pulse data, the wavelet packet (WP) transform is applied to phase differentials to extract unique features. These features describe the tested pulse and, consequently, the tested signal source. After the matching process with the database of stored source features, the source may be identified, it may be flagged as a new source, or the results of matching may be inconclusive. In the latter case, a second-tier feature extraction process can be utilized, for example, such as extracting the feature vector of Fourier spectral coefficients in block 220. The aim of this additional set of features is to refine inconclusive results of the wavelet packet match. If, on the other hand, a source is flagged as new source, it can be added to the database 208 if the cumulative SNR of the pulses representing the source is high. In practice, a baseline SNR can be used to determine if a new source is added to the database, such as using a cumulative SNR of the pulses for the new source being greater or equal to 35 dB before a new entry in the database is made.

Figure 2B:
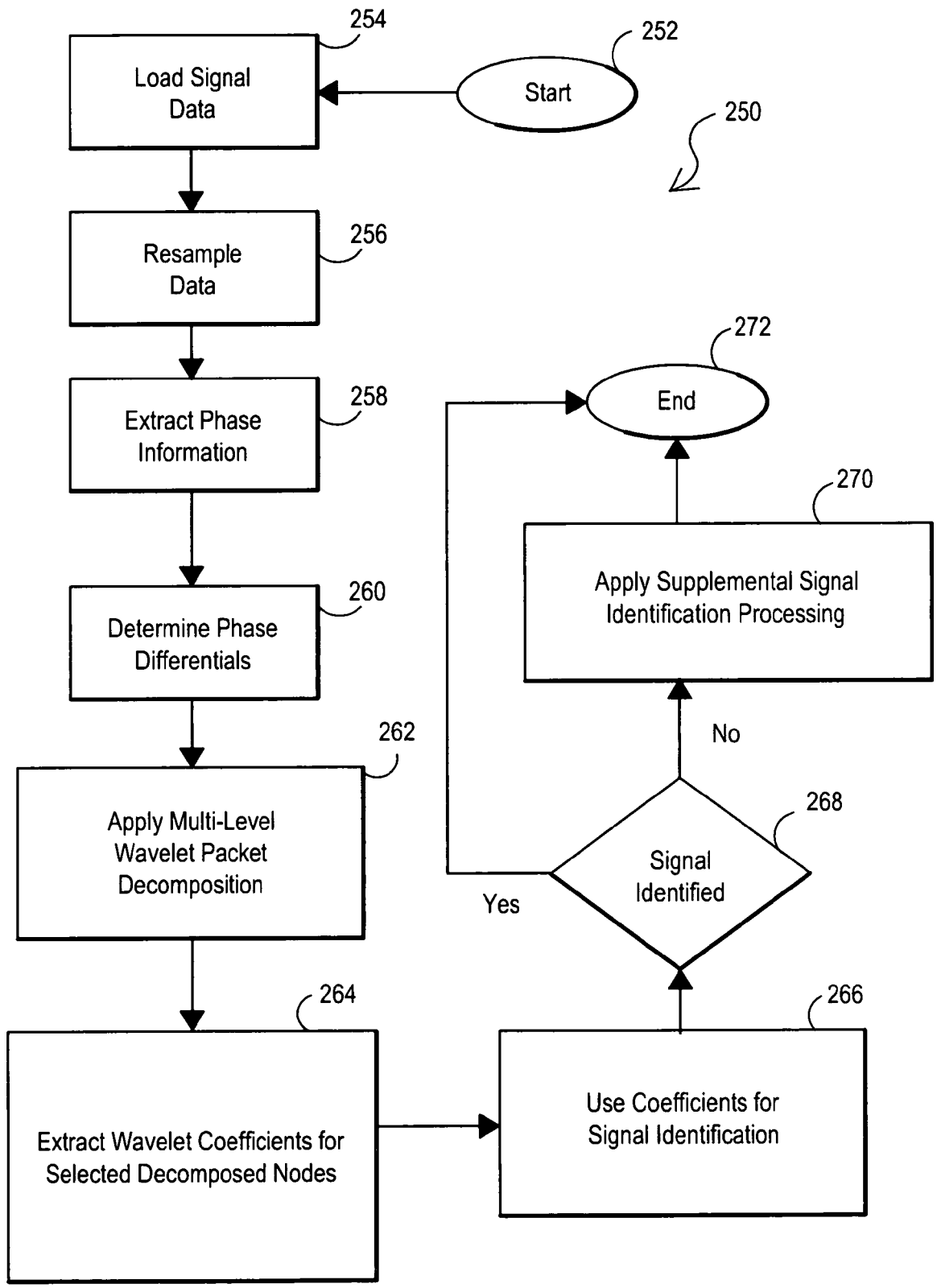
FIG. 2B is a flow chart for an example operational process associated with the wavelet-based signal source identification system of FIG. 2A.

FIG. 2B is a flow chart for an example operational process 250 that can be associated with the wavelet-based signal source identification system of FIG. 2A. From the start 252 of the process, flow initially passes to step 254 where signal data is loaded into the system. In block 256, this signal data is then resampled, if desired. Phase information is then extracted from the input or resampled signal data in block 258. And phase differentials are determined in block 260. Multi-level wavelet packet decomposition processing, which is described in more detail below, is then applied in block 262. Next, in block 264, the wavelet processing extracts wavelet coefficients for selected decomposed nodes. In block 266, these selected wavelet coefficients are used as a wavelet signature for signal identification, for example, with respect to a database of wavelet signatures. Decision block 268 determines if a match has occurred and, therefore, a signal has been identified. If "yes," then flow passes to the end 272. If "no," as indicated above, supplemental signal identification processing can be applied in block 270 before reach the end 272 of the process.

With respect to wavelet processing, a variety of wavelet processing techniques could be employed. There are many known wavelet systems, including: Haar wavelets, Sinc wavelets, Spline and Battle-Lemarié wavelets, Daubechies' wavelets, and Coiflet wavelets. The differences among these wavelet systems include parameters such as the way in which the wavelets are defined, the degrees of freedom and design constraints. The examples described in this application utilize the Daubechies' wavelet system, as discussed, for example, in the articles: Daubechies, "*Orthonormal Bases of Compactly Supported Wavelets*," Communications on Pure and Applied Mathematics, 41: pp 909–996 (November 1988); and Daubechies, "*Ten Lectures on Wavelets*," SIAM, Philadelphia, Pa. (1992). And for this Daubechies' wavelet system, a system of length-12 can be used, if desired. In addition, the decomposition of signals using wavelet systems or wavelet transforms, as discussed herein, consists of partitioning the time-scale plane into tiles according to indices k and j. This partition is possible for orthogonal bases, and signal energy is partitioned following Parseval's equation, which is known in the field of wavelet processing. The shape and location of the tiles is a logarithmic partitioning. The tile partitioning will depend on the number of bands, and whether one uses wavelet packets or time-varying wavelets. The tiling typically will not depend on the particular coefficients, number of coefficients, or the number of zero moments. As discussed further below, the decomposition of wavelets can be performed for a two-band wavelet system or, more generally, to a multi-band (M-band) wavelet system.

The following equations provide, in general terms, orthonormal wavelet and scaling function sets that can be used for the wavelet processing:

$$c_j(k) = \sum_m h(m - 2k)c_{j+1}(m)$$

$$d_j(k) = \sum_m h_1(m - 2k)c_{j+1}(m).$$

Figure 3A:
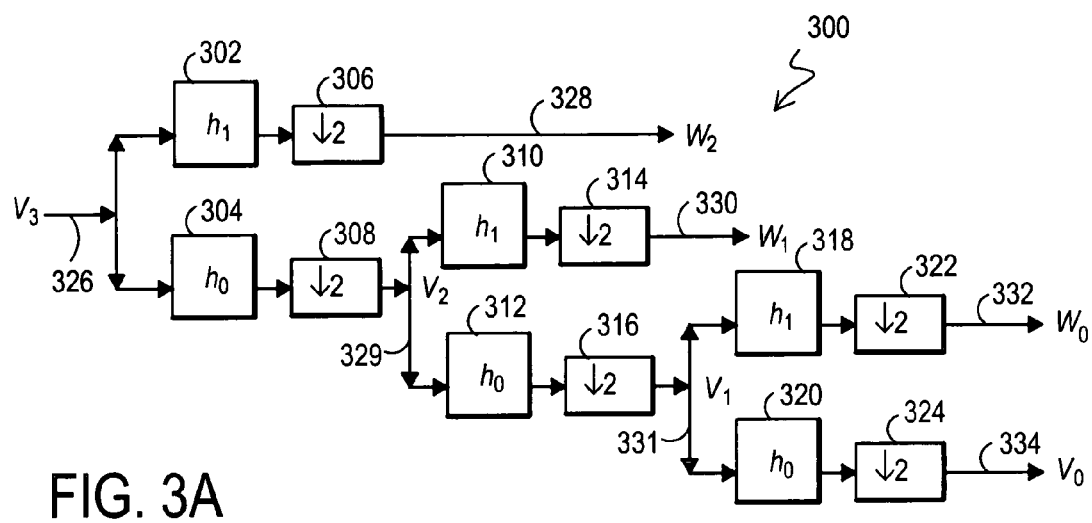
FIG. 3A is a block diagram of a frequency band analysis tree that represents part of the wavelet-based signal processing.
Figure 3B:
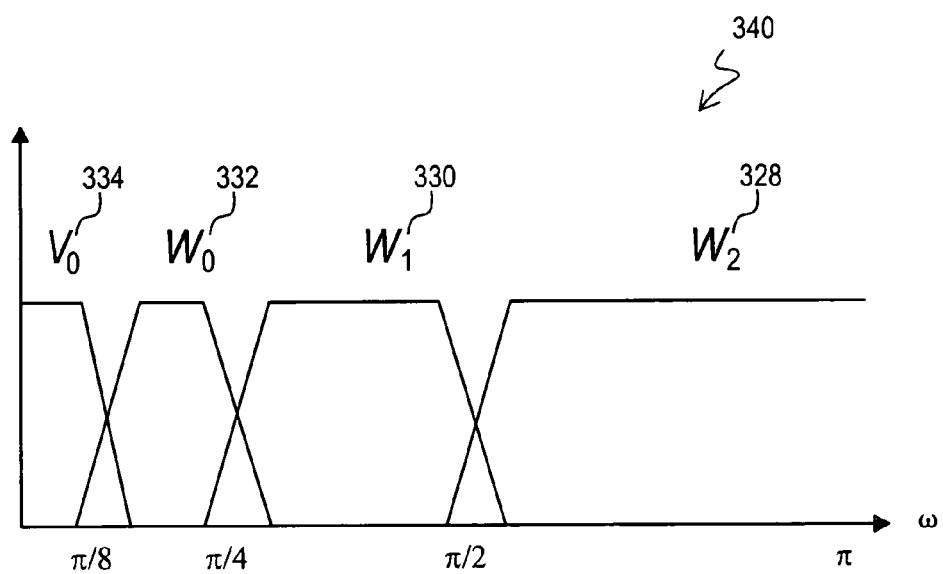
FIG. 3B is a frequency diagram of the frequency bands associated with the analysis tree of FIG. 3A.

The equations can be illustrated as a filter bank shown in FIG. 3A below. Both $h_1(n)$ and $h_0(n)$ are used to denote wavelet coefficients and scaling function coefficients, respectively. Filtering and decimation can be repeated on scaling coefficients, creating an iterative filter bank. The filter with coefficients $h_0(-n)$ is a low-pass filter, and the filter with $h_1(-n)$ is a high-pass filter. This process first divides spectrum of $c_{j+1}(k)$ into a low-pass and high-pass bands, resulting in scaling and wavelet coefficients $c_j(k)$ and $d_j(k)$, respectively. The second stage of the analysis divides lower half of the spectrum into quarters, and so on. This results in logarithmic set of bandwidths. For the high scales, $c_{j+1}(k)$ the scaling functions behave like a delta functions, so the high scale coefficients are obtained by sampling of f(t). FIG. 3A and FIG. 3B, as discussed further below, provide time and frequency representations for the analysis tree.

A classical two-band wavelet system typically provides a logarithmic frequency resolution. The low frequencies use narrow bandwidths, and the high frequencies use wide bandwidths. This is represented, for example, in FIG. 3A.

One system has been proposed that would allow a finer and adjustable resolution of high frequencies, and this system has been called the wavelet packet system. Such a system is described in the following article: Coifman and Wickerhauser, "*Entropy-Based Algorithms for Best Basis Selection*," IEEE Transactions on Information Theory, 38(2): 713–718 (March 1992). Wavelet packets provide a better structure for the analysis of signals at the expense of computational complexity.

Figure 3C:
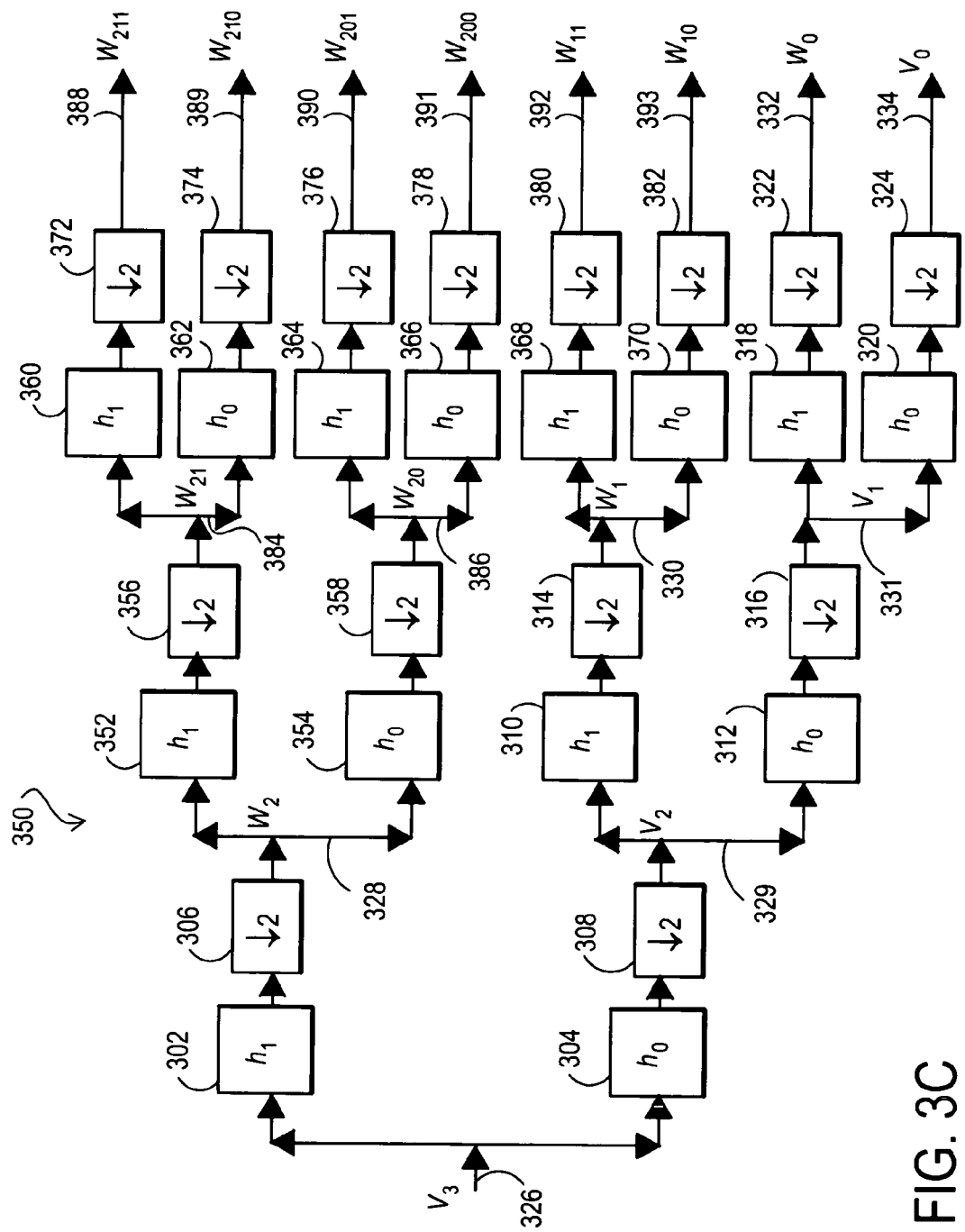
FIG. 3C is a block diagram of a three level wavelet packet decomposition tree.

The M-band discrete wavelet transform, such as shown graphically in FIG. 3C, gives a flexible tiling of the time-frequency plane. The tiles are associated with a particular tree-structured filter band where the low-pass channel is split into M bands. Combining the M-band and wavelet packet structure gives structured tree and allows for flexible decomposition. FIG. 3C further illustrates the decomposition into a full wavelet packet tree. For a fixed set of filters, one can obtain an advantageous, and in some sense the best, filter tree topology. For binary trees, an efficient scheme is achieved with entropy as a criterion for decomposition. The processing of the present invention uses the wavelet packet binary tree to decompose the signal into full wavelet packet decomposition.

FIG. 3A is a block diagram of a frequency band analysis tree 300 that represents part of the wavelet-based signal processing. The input signal stream ($v_3$) 326 is split into two signal paths and passed through a high-pass filter block ($h_1$) 302 and a low-pass filter block ($h_0$) 304. The resulting signal paths are passed through divide-by-two down-converters 306 and 308, respectfully. The outputs of these down-converters 306 and 308 are represented by signal ($w_2$) 328 and signal ($v_2$) 329. In the example depicted, the lower phase path is then split further by splitting signal ($v_2$) 329 into two signal paths and passing these signal paths through a high-pass filter block ($h_1$) 310 and a low-pass filter block ($h_0$) 312. As before, the resulting signal paths are again passed through divide-by-two down-converters 314 and 316, respectfully. The outputs of these down-converters 314 and 316 are represented by signal ($w_1$) 330 and signal ($v_1$) 331. In the example depicted, the lower phase path is again split further by splitting signal ($v_1$) 331 into two signal paths and passing these signal paths through a high-pass filter block ($h_1$) 318 and a low-pass filter block ($h_0$) 320. Again, the resulting signal paths are passed through divide-by-two down-converters 322 and 324, respectfully. The outputs of these down-converters 322 and 324 are represented by signal ($w_0$) 332 and signal ($v_0$) 334. In this way, the input signal stream ($v_3$) 326 is decomposed into multiple levels or bands of phase differentiated signals.

FIG. 3B is a frequency diagram 340 of the frequency bands associated with the analysis tree 300 of FIG. 3A. The signal node ($w_2$) 328, which represents a first level decomposition node, has been decomposed to phase differentials between $\pi/2$ and $\pi$. The signal node ($w_1$) 330, which represents a second level decomposition node, has been decomposed to phase differentials between $\pi/4$ and $\pi/2$. The signal node ($w_0$) 332, which represents a third level decomposition node, has been decomposed to phase differentials between $\pi/8$ and $\pi/4$. And the signal node ($v_0$) 334, which also represents a third level decomposition node, has been decomposed to phase differentials between 0 and $\pi/8$.

FIG. 3C is a block diagram of a three level, two-band wavelet packet decomposition tree 350. With respect to the generation of the first level signal node ($w_2$) 328, the second level signal nodes ($w_1$) 330 and ($v_1$) 331, and the third level signal nodes ($w_0$) 332 and ($v_0$) 334, this decomposition tree matches that of FIG. 3B. However, the decomposition tree of FIG. 3C further shows the decomposition to a fourth level for all the signal paths. Similar to the paths that generated the second level signal node ($v_1$) 331 and the third level signal nodes ($w_0$) 332 and ($v_0$) 334, the second level signal node ($w_{21}$) 384 and the third level signal nodes ($w_{211}$) 388 and ($w_{210}$) 389 are generated through high-pass filter block ($h_1$) 352, divide-by-two down converter 356, high-pass filter block ($h_1$) 360, low-filter block ($h_0$) 362, and divide-by-two down converters 372 and 374. Similarly, the second level signal node ($w_{20}$) 386 and the third level signal nodes ($w_{201}$) 390 and ($w_{200}$) 391 are generated through low-pass filter block ($h_1$) 354, divide-by-two down converter 358, high-pass filter block ($h_1$) 364, low-filter block ($h_0$) 366, and divide-by-two down converters 376 and 378. And the third level signal nodes ($w_{11}$) 392 and ($w_{10}$) 393 are generated through high-pass filter block ($h_1$) 368, low-filter block ($h_0$) 370, and divide-by-two down converters 380 and 382. As such, the block decomposition tree 350 has eight third level signal nodes ($w_{211}$, $w_{210}$, $w_{201}$, $w_{200}$, $w_{11}$, $w_{10}$, $w_0$, $v_0$), four second level signal nodes ($w_{21}$, $w_{20}$, $w_1$, $v_1$), two first level signal nodes ($w_2$, $v_2$), and an input signal node ($v_1$). It is noted that additional levels could be similarly decomposed, if desired.

Looking back to FIG. 2A, it is noted again that before the wavelet processing is conducted, the received signal data is pre-processed to isolate individual signal streams. With respect to the input data signals, pulses are collected at a specific frequency and sampling rate, de-interleaved and stored. Pulses originating from the same emitter or source are stored together, and their signature is extracted. Pulses collected often contain a certain amount of the pre-trigger and post-trigger data. After the rate conversion in the SHRC block 202, a complex (I and Q paths or IQ data) pulse signal is passed to a function in the detect and coarse measure block 204 to find leading and trailing edges of the pulse. The leading edge is the starting 50% point of the maximum magnitude, also called a 3 dB point. Similar to the leading edge, the trailing edge is computed as the ending 50% point of the maximum magnitude. There are other algorithms and methods developed to compute leading and trailing edges; however, the 50% method can be utilized. Once it is known where the pulse starts and stops, the phase of the IQ data is computed.

The phase information in a signal is often independent of small power fluctuations of a signal and is often a more desirable source of signal information. Phase unwrapping, therefore, is often desirable to capture the change in phase as a function of time. The phase differential block 212 determines this phase differential information. The phase differential describes how the frequency of the pulse changes over time, making it a good signal descriptor. The phase differential can then be windowed, for example, by using two fixed size windows: 64-point and 256-point windows. These windows are applied to phase differential pulse data, starting from the leading edge of the pulse. The window size depends on the pulse width. A skip factor determines the selection of the data for the processing window. For example, if the skip factor is equal to two, every second sample of the pulse is used to populate a processing window. If there is a deficiency of a pulse data to populate the processing window, the last pulse data point can be repeated, instead of standard zero padding, until the data fills the desired processing window. Once the data for processing has been selected, wavelet packet decomposition can be applied in block 214 to decompose the data.

As discussed above, wavelet packets decompose pulse data into time-frequency tiles of various resolutions. Each tile consists of wavelet packet coefficients. These coefficients determine the characteristics of the signal. As indicated above, one wavelet system that can be used in this decomposition is Daubechies-12 (Daubechies' wavelet system of length-12), including 24 coefficients, which is advantageous due to its smoothness and number of vanishing moments. Example coefficients of Daubechies wavelet and corresponding scaling functions are provided in TABLE 1 below.

TABLE 1

SCALING FUNCTION AND WAVELET COEFFICIENTS

N = 12

| n | h (n) | $h_1$ (n) |
|---|---|---|
| 0 | 0.01311225795723 | 0.00000152907176 |
| 1 | 0.10956627282118 | 0.00001277695222 |
| 2 | 0.37735513521420 | 0.00002424154576 |
| 3 | 0.65719872257929 | −0.00008850410921 |
| 4 | 0.51588647842780 | −0.00038865306282 |
| 5 | −0.04476388565378 | 0.00000654512821 |
| 6 | −0.31617845375278 | 0.00217950361863 |
| 7 | −0.02377925725606 | 0.00224860724100 |
| 8 | 0.18247860592758 | −0.00671149900880 |
| 9 | 0.00535956967436 | −0.01284082519830 |
| 10 | −0.09643212009650 | 0.01221864906975 |
| 11 | 0.01084913025583 | 0.04154627749509 |
| 12 | 0.04154627749509 | −0.01084913025583 |
| 13 | −0.01221864906975 | −0.09643212009650 |
| 14 | −0.01284082519830 | −0.00535956967436 |
| 15 | 0.00671149900880 | 0.18247860592758 |
| 16 | 0.00224860724100 | 0.02377925725606 |
| 17 | −0.00217950361863 | −0.31617845375278 |
| 18 | 0.00000654512821 | 0.04476388565378 |
| 19 | 0.00038865306282 | 0.51588647842780 |
| 20 | −0.00008850410921 | −0.65719872257929 |
| 21 | −0.00002424154576 | 0.37735513521420 |
| 22 | 0.00001277695222 | −0.10956627282118 |
| 23 | −0.00000152907176 | 0.01311225795723 |

As discussed in more detail with respect to FIG. 4 below, four levels of decomposition can used to provide the partitioning of signal into the approximation (low resolution) and details (high resolution). In wavelet packet analysis, the details as well as the approximations can be split. For N-level decomposition, there are N+1 possible ways to decompose or encode the signal. An entropy-based criterion can be used to perform full decomposition of a given signal. Therefore, each node of the decomposition tree is analyzed, and the information to be gained by performing the split is quantified. Once the full tree is created, only few tiles typically carry consistent information from pulse to pulse. Due to this result, a full signal representation and signal reconstruction are often not needed. Knowing that pulses are transient signals, it can be expected that most of the signal features would be in the region of low frequencies. As discussed below with respect to FIGS. 5A–C, several frequency bands have been found to contain consistent, prominent information, while the other bands typically suffer from inconsistency. The explanation for such characteristics likely reside in the analysis of signal energy, signal entropy, and persistence of the features.

Figure 4:
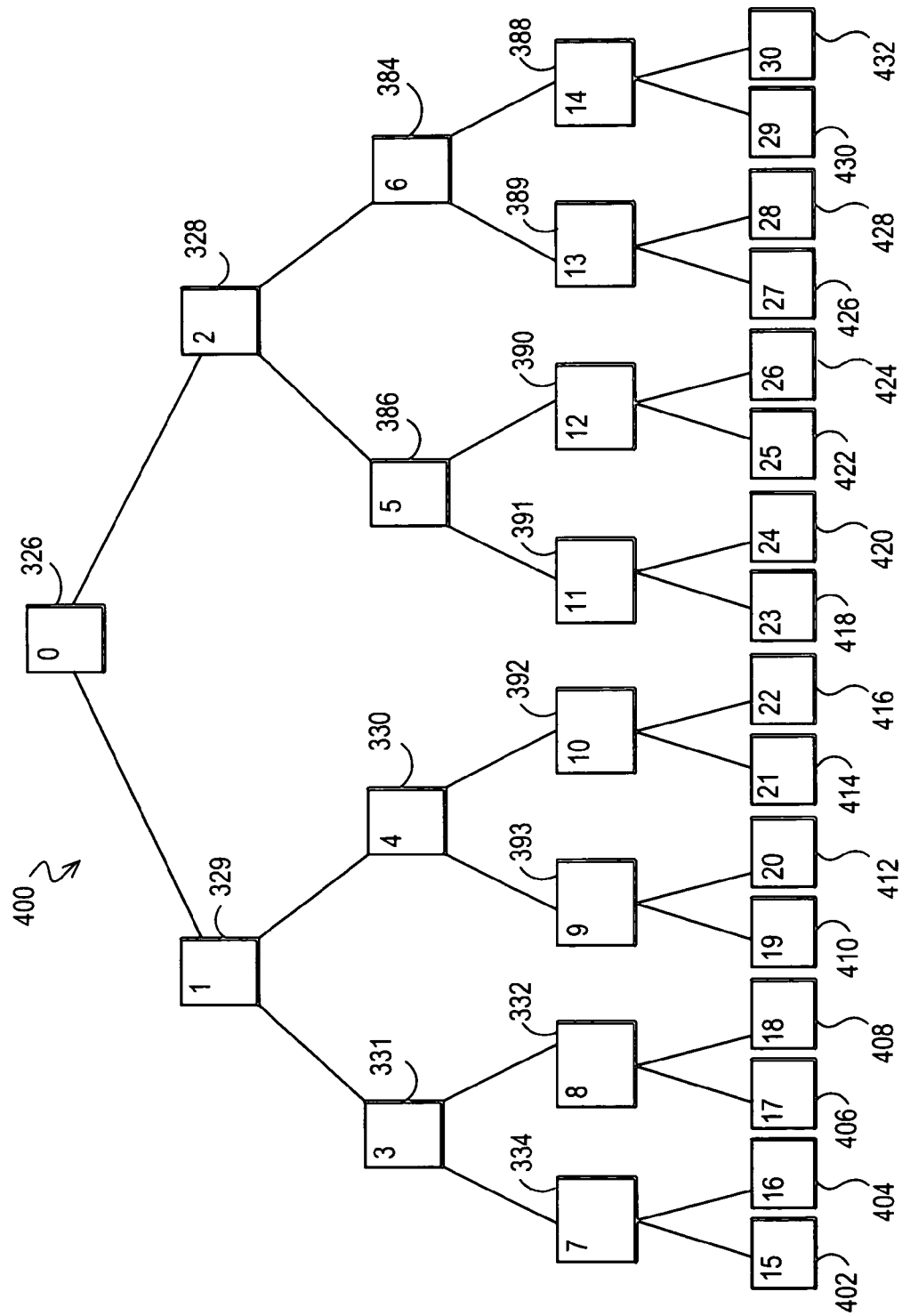
FIG. 4 is a block diagram for a wavelet packet partitioning tree.

FIG. 4 is a block diagram for a four level wavelet packet partitioning tree 400, illustrating time-frequency partitioning of an input signal into a binary tree wavelet packet. This tree 400 provides a different representation for the signal nodes generated by multi-level wavelet decomposition as described above with respect to FIGS. 3A–C. For identification purposes, the nodes have been numbered. As depicted, the initial signal node 326 is numbered as NODE 0. The first level decomposition nodes 329 and 328 are numbered NODE 1 and NODE 2, respectively. The second level decomposition nodes 331, 330, 386 and 384 are numbered NODE 3, NODE 4, NODE 5 and NODE 6, respectively. The third level decomposition nodes 334, 332, 393, 392, 391, 390, 389 and 388 are numbered NODE 7, NODE 8, NODE 9, NODE 10, NODE 11, NODE 12, NODE 13 and NODE 14, respectively. The fourth level decomposition nodes 402, 404, 406, 408, 410, 412, 414, 416, 418, 420, 422, 424, 426, 428, 430 and 432 are numbered NODE 15, NODE 16, NODE 17, NODE 18, NODE 19, NODE 20, NODE 21, NODE 22, NODE 23, NODE 24, NODE 25, NODE 26, NODE 27, NODE 28, NODE 29 and NODE 30. In operation, these nodes can be ordered as partitioning takes place. The partitioning is equivalent to the full wavelet packet (WP) decomposition tree discussed above with respect to FIG. 3C. The initial signal 326, denoted as NODE 0, is decomposed using wavelet packets into "low" frequency (denoted as 1) and "high" frequency (denoted as 2) components, obtaining the wavelet packet coefficients. Similarly, each node is further decomposed into its "low" and "high" frequency components, with each left branch corresponding to "low" and with each right branch corresponding to "high" frequency components.

Figure 5A:
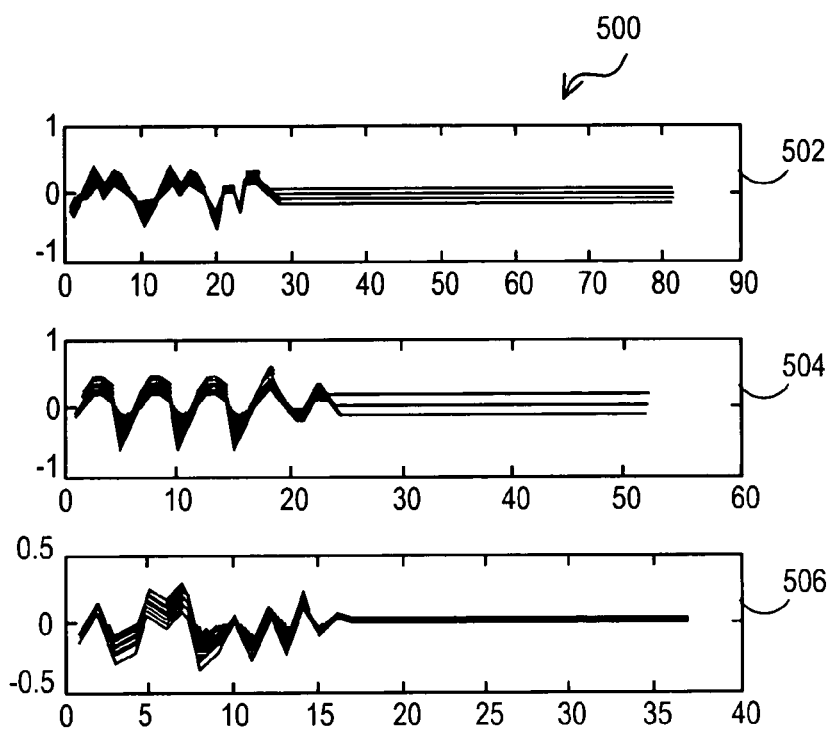
FIG. 5A is a wavelet packet decomposition diagram of NODES 3, 7 and 16 for an example medium pulse width signal.
Figure 5B:
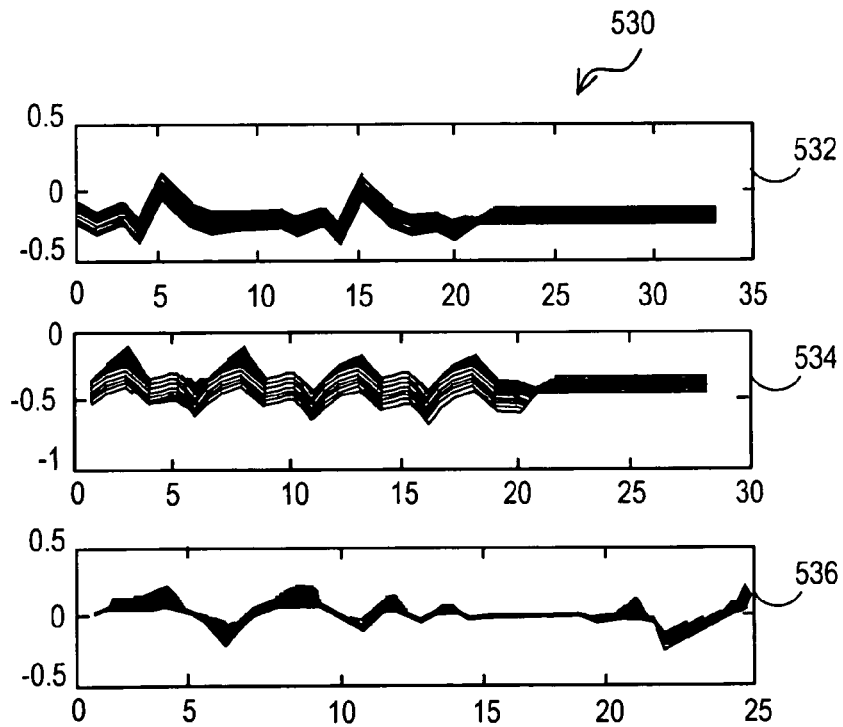
FIG. 5B is a wavelet packet decomposition diagram of NODES 3, 7 and 16 for an example short pulse width signal.
Figure 5C:
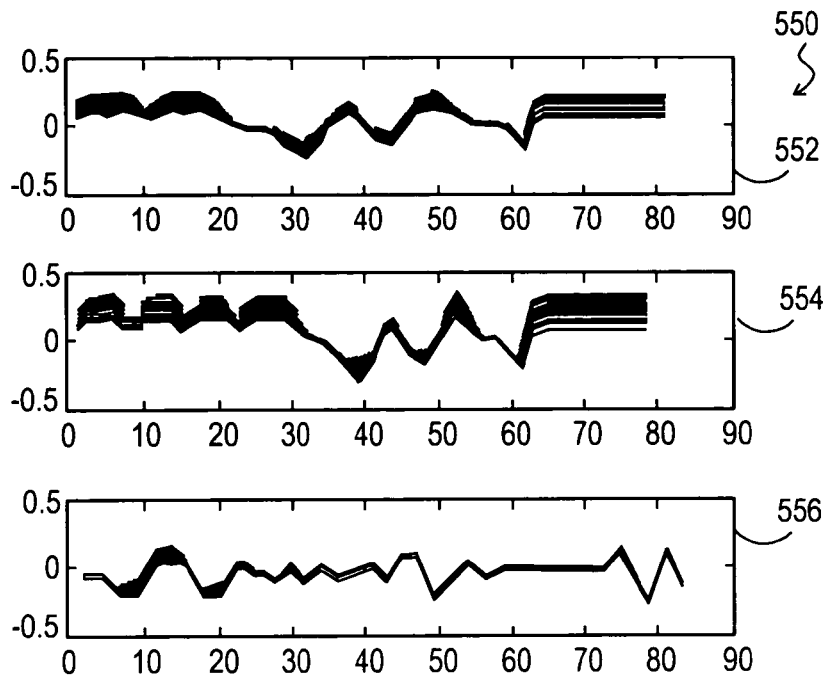
FIG. 5C is a wavelet packet decomposition diagram of NODES 3, 7 and 16 for an example long pulse width signal.

The wavelet processing of the present invention, therefore, decomposes the input signal into different nodes. Different nodes can then be chosen to provide the wavelet signature for the input signal. And certain nodes can be more effective than others in distinguishing signal sources. Based upon the analysis of a large number of input pulses, the greatest consistency in wavelet packet coefficient shapes for these sample input pulses were found to be in nodes 3, 7 and 16. FIG. 5A is the result of wavelet processing on a number of medium pulse width signals. FIG. 5B is the result of wavelet processing on a number of short pulse width signals. And FIG. 5C is the result of wavelet processing on a number of long pulse width signals. FIGS. 5A–C, therefore, illustrate the wavelet packet decomposition coefficients for three nodes, for medium, short and long pulse widths, respectively. There is a significant consistency in WP coefficients within a single node for multiple pulses of the same signal source. However, there is a clear difference between the signal sources when their wavelet packet coefficients are observed for the three nodes. FIGS. 5A–C depict the similarities in WP coefficients for pulses originating from the same signal source, and the differences in WP coefficients for those of different signal sources. The consistency among the different signals mapped for each node, for each given pulse type, as well as the differences among these three signature nodes for each pulse type, shows the usefulness of using these nodes for signature information. These nodes, therefore, can be selected as a data source for feature extraction and to provide wavelet signature information.

FIG. 5A is a wavelet packet decomposition diagram 500 of NODES 3, 7 and 16 for an example medium pulse width signal. NODE 3 is represented by signals 502. NODE 7 is represented by signals 504. And NODE 16 is represented by signals 506. The vertical axes for these signal charts are relative values, and the horizontal axis for these signal charts represents the coefficient index. For signals 502, the value ranges from 1 to −1, and the coefficient index ranges from 0 to 90. For signals 504, the value ranges from 1 to −1, and the coefficient index ranges from 0 to 60. For signals 506, the value ranges from 0.5 to −0.5, and the coefficient index ranges from 0 to 40. It is noted that the coefficient index range is dependent upon the original input length of the data.

FIG. 5B is a wavelet packet decomposition diagram 530 of nodes 3, 7 and 16 for an example short pulse width signal. NODE 3 is represented by signals 532. NODE 7 is represented by signals 534. And NODE 16 is represented by signals 536. The vertical axes for these signal charts are relative values, and the horizontal axis for these signal charts represents the coefficient index. For signals 532, the value ranges from 0.5 to −0.5, and the coefficient index ranges from 0 to 35. For signals 534, the value ranges from 0 to −1, and the coefficient index ranges from 0 to 30. For signals 536, the value ranges from 0.5 to −0.5, and the coefficient index ranges from 0 to 25. It is again noted that the coefficient index range is dependent upon the original input length of the data.

FIG. 5C is a wavelet packet decomposition diagram 550 of nodes 3, 7 and 16 for an example long pulse width signal. NODE 3 is represented by signals 552. NODE 7 is represented by signals 554. And NODE 16 is represented by signals 556. The vertical axes for these signal charts are relative values, and the horizontal axis for these signal charts represents the coefficient index. For signals 552, the value ranges from 0.5 to −0.5, and the coefficient index ranges from 0 to 90. For signals 554, the value ranges from 0.5 to −0.5, and the coefficient index ranges from 0 to 90. For signals 556, the value ranges from 0.5 to −0.5, and the coefficient index ranges from 0 to 90. As above, it is noted that the coefficient index range is dependent upon the original input length of the data.

A signal differential can be computed for each of the above nodes of wavelet packet coefficients to encode the slope. For this encoding, positive slopes are encoded with 1, negative slopes or zero slopes are encoded as 0. This process encodes the entire signal into the binary representation of its extremes. If 1s and 0s are treated as binary bits, then the every group of 8 bits can be replaced with one unsigned integer number, 0–255. Furthermore, in signal pulse processing, it is generally expected that very little of the pulse's useful identification information resides in the middle of the pulse. And the end of the pulse (trailing edge) is often corrupted with multi-path distortions. Therefore, many prior techniques have focused on the pulse characteristics at the leading edge and the initial transient response. For the present invention, the first 24 points of every encoded signal can often provide sufficient identification information about a signal's shape. These 24 points can be represented with 3 integer values per node signal. For the three selected nodes (3, 7, 16) discussed above with respect to FIGS. 5A–C, therefore, a 9-dimensional signature vector per single pulse can be created. The decimal entry is a short form of its binary encoding.

Figure 6:
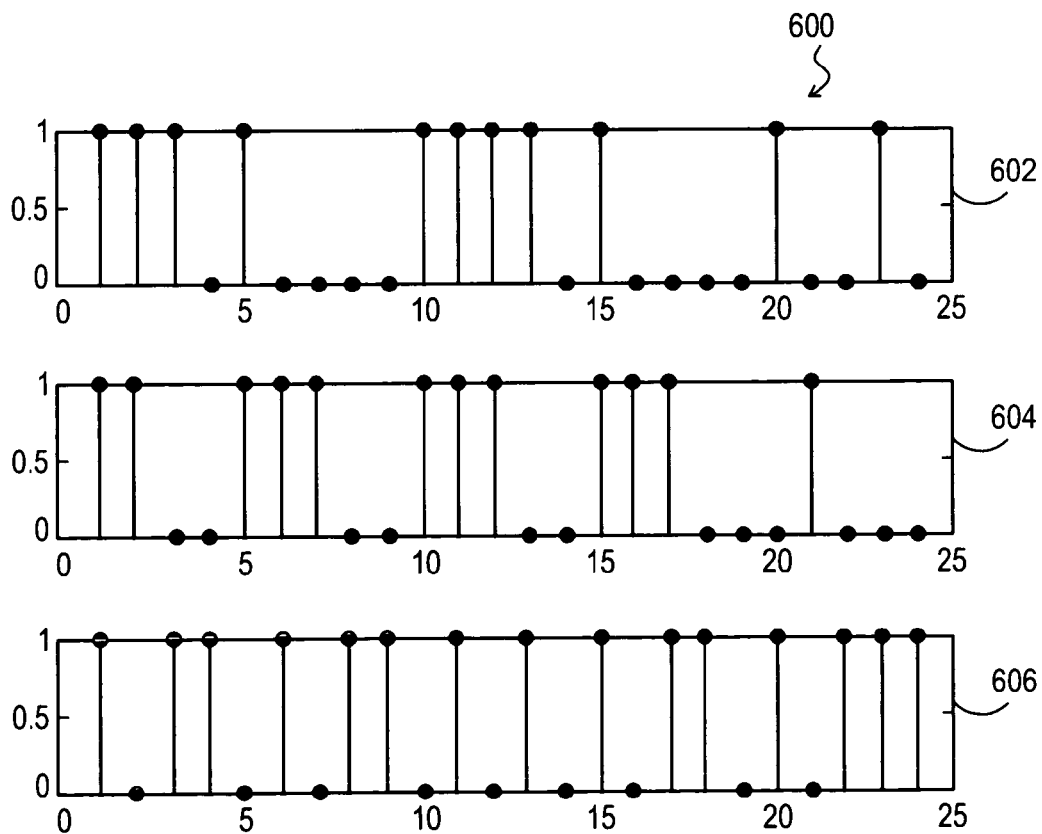
FIG. 6 is a slope coefficient index diagram of NODES 3, 7 and 16 for an example pulse signal.

FIG. 6 provides an example slope coefficient index diagram 600 for 24 points of the selected nodes (3, 7, 16) for an example pulse signal. To better use the wavelet signatures for processing, a slope analysis can be done for the signals analyzed. A positive slope is set as a "1," and a negative slope is set as a "0." NODE 3 is represented by signals 602. The vertical axis ranges from 1 to 0, and the horizontal axis represents the coefficient index. NODE 7 is represented by signals 604. The vertical axis ranges from 1 to 0, and the horizontal axis represents the coefficient index. NODE 16 is represented by signals 606. The vertical axis ranges from 1 to 0, and the horizontal axis represents the coefficient index.

In determining the slope for each point, once the binary slope representation is completed for one pulse, the next pulse can be processed, and resulting vectors can be added. The process continues until every valid pulse is used. A valid pulse can be defined as one that passes the thresholds for low SNR and bandwidth. Alternatively, every pulse can be used without limitation, if desired. After processing, the final sum of feature vectors is averaged (1s and 0s are added and averaging is done per feature). If the resulting average of the vector entries is greater than 0.5, the entry it is replaced with 1, or 0 otherwise. This process allows dominant slopes to win over ones that are affected by noise, by errors in de-interleaving, or by pulse leading and trailing edge detection. The resulting 9-dimensional feature vector contains the 24-point slope description of the three time-frequency tiles generated using wavelet packet decomposition and represents a useful wavelet signature of the signal source for database storage or database retrieval.

As described above with respect to FIGS. 2A and 2B, wavelet-based signature can be compared with a database of signal source information to determine if a match be identified. In the embodiment of FIG. 6, therefore, the 9-dimensional feature vector can be compared against a database of stored vector signatures. One technique that can be used in this comparison is a comparison in the terms of Hamming distance. Hamming distance is defined as the number of bits that are different between two binary strings. As applied to the vector comparison with respect to a vector of the form shown in FIG. 6, Hamming distance represents the number of locations where the slopes in the signal decomposition are different. This Hamming distance technique can be utilized to provide an indication of how well the analyzed signals from an unknown or non-confirmed signal source match the signals from known sources stored in the database. If the Hamming distance comparison with stored signal source data results in a single match, the identification can be deemed done. If the returned Hamming distance is too high, indicating that no match has been found, the signal source can be identified as a new signal source. If desired, it could be left up to a user to decide whether to add the new signal source to the database.

As discussed above, sometimes, for example, in a densely populated database of signal sources, a single tier matching system may not be sufficient to distinguish a signal source. Therefore, additional tiers of supplemental identification processing can be added. For example, a second tier can be introduced to refine the matching criteria when two or more signal sources in the database end up having the same Hamming distance with respect to the analyzed signals or end up having Hamming distances that falls within some threshold amount of each other. For example, if multiple stored signals sources have the same Hamming distance, a second-tier comparison using spectral coefficients can be engaged. In such a second-tier analysis, the minimum Euclidean norm can be used, if desired, as distance criteria between spectral coefficients of the unknown pulse signals and spectral coefficients of pulse signals in the database. The signal source with the minimum distance to the test feature is typically identified as the match. Sometimes, however, it may be desirable to identify both the best and second best matches. The wavelet-based processing of the present invention allows for that extension.

As shown with respect to FIG. 2A, one supplemental identification processing technique that can be used to generate spectral coefficients is a Fourier transform analysis. In general, Fourier spectral coefficients are obtained by performing a Fourier transform of a signal. When a signal is subjected to Fourier transform processing, the spectral coefficients often describe the signal behavior. The output values after the Fourier transform are complex numbers that can be used as features. The Fourier transform of signal $x(j)$ can be represented by:

$$X(k) = \sum_{j=0}^{N-1} x(j)\omega_n^{(j)(k)}$$

The coefficients X(k) are called Fourier spectral coefficients. The database matching refinement can use the Fourier spectral coefficients as additional features for signal source identification. For example, the spectral coefficients can be obtained by taking the Fourier transform of the phase differential. And nine coefficients can be extracted from the set of spectral coefficients starting from the second one. Although real and/or complex parts of the Fourier spectral coefficients can be used for the signal characterization, for simplification, imaginary parts of the nine coefficients can be used as the second-tier features to supplement the identification of similar signal sources that were not distinguished by the wavelet-based signature.

Looking back to FIG. 2B and considering the additional discussion above, in one example embodiment as disclosed herein, the wavelet-based processing approach of the present invention can be summarized into following processing steps:
  a) Load real data signals (pulses).
  b) Resample data to the desired sampling rate (e.g., 160 Msps for the IQ data paths).
  c) Extract the phase information from the data.
  d) Compute the phase differential and use it as input signal to the wavelet packet processing.
  e) Compute the full wavelet packet decomposition into 4 levels.
  f) Extract the wavelet coefficients from the decomposed nodes 3, 7 and 16.
  g) Perform binary encoding of the slopes for the selected nodes and extract 9-dimensional feature vector (per signal source).
  h) Compute 9 spectral coefficients using the phase differential (creating additional 9-dimensional feature vector) and Fourier transform processing.
  i) Test first set of wavelet-based features against the database using Hamming distance as criteria.
  j) If the result of testing is a single signal source, the identification is over.
  k) If more than one signal source in database has same Hamming distances, perform the distance measure test on the spectral features. The emitter with the minimum distance is considered the best match.
  l) If smallest Hamming distance is still quite large, a new signal source may have been detected. The signal source may be stored in the database if the collected pulses have high SNR, subject to user's discretion.

Figure 7:
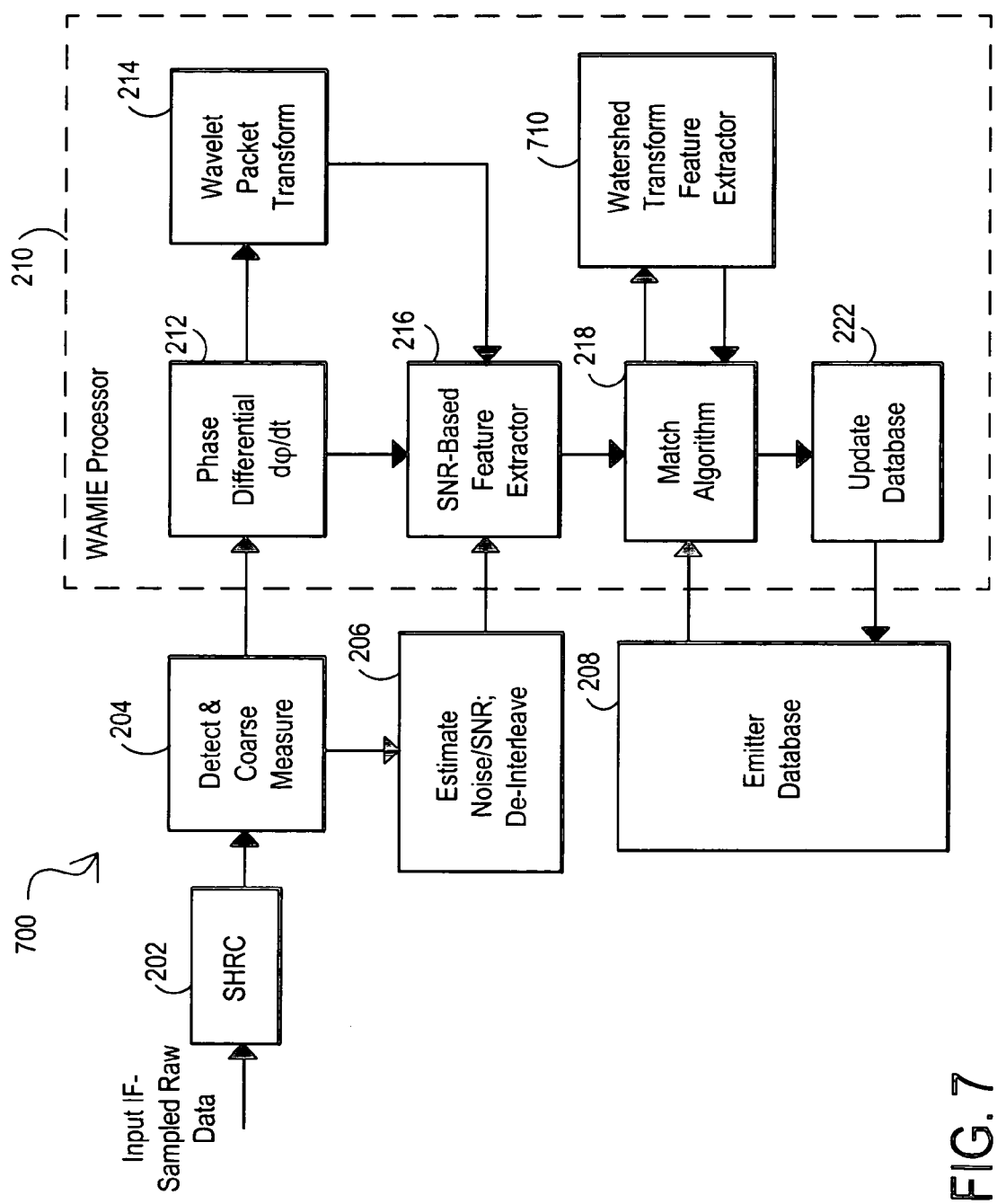
FIG. 7 is a block diagram of an alternative embodiment for a wavelet-based signal source identification system.

FIG. 7 is a block diagram of an alternative embodiment 700 for a wavelet-based signal source identification system using a different technique for the supplemental identification processing. This embodiment 700 is similar to the embodiment 200 of FIG. 2A except that this different processing technique is used for supplemental identification block 710. In particular, for this embodiment 700, a watershed transform feature extractor is used to provide supplemental signature processing. Watershed transforms are typically used for image segmentation procedures and are region-based transformations. Watershed transforms, however, can also be applied to wavelet decomposition information to segment these signals into regions. The first step in this process is an intelligent step in which significant minima is extracted from the signals. The second step is a mechanical step where a watershed algorithm is applied to the signal and in so doing, is guided by the extracted minima or by markers associated with those minima. The features extracted using the watershed transform processing can then be used for supplemental signal source identification.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method for identifying signal sources, comprising:
   determining phase differential data for an input signal stream, the input signal stream corresponding to signal data from a single signal source of unknown identity;
   applying wavelet packet processing to the phase differential data to generate a wavelet-based signature for the input signal stream;
   accessing a database having stored data including wavelet-based signatures corresponding to known signal sources, known signal sources being signal sources that have been previously identified; and
   comparing the signature for the input signal stream with the stored data to determine if the signature for the input signal stream matches wavelet-based signatures stored for known signal sources;
   identifying the input signal stream as a known signal source based upon the determination if a match is made; and
   outputting an indication of the identity of the signal source of the input signal stream.

2. The method of claim 1, further comprising acquiring data signals including combined signal streams from a plurality of signal sources; pre-processing the data signals to separate the data signals into a plurality individual signal streams, each individual signal stream being deemed to have originated from a single signal source; and using one of the individual signal streams for the determining step.

3. The method of claim 2, further comprising resampling the data signals at a selected sampling rate prior to the pre-processing step.

4. The method of claim 1, further comprising applying supplemental identification processing to the signal data to provide additional identification information for the input signal stream.

5. The method of claim 4, wherein supplemental identification processing comprises Fourier transform processing that generates spectral coefficients, and wherein the stored data in the database further includes spectral coefficient signatures corresponding to known signal sources.

6. The method of claim 1, further comprising adding signature data to the database if the input signal stream is not found to match signatures of known signal sources stored in the database.

7. The method of claim 1, wherein the applying step comprising performing full wavelet packet decomposition into multiple levels to generate a plurality of decomposed nodes.

8. The method of claim 7, further comprising selecting a plurality of decomposed nodes and using wavelet coefficients for these selected nodes in generating the wavelet-based signature.

9. The method of claim 8, wherein the multiple levels is four levels.

10. The method of claim 9, wherein nodes 3, 7 and 16 are selected for use in generating the wavelet-based signature, the node numbers representing a numbering scheme where the first level nodes are numbered 1 and 2 from low to high; where the second level nodes are numbered 3, 4, 5 and 6 from low to high; where the third level nodes are numbered 7, 8, 9, 10, 11, 12, 13 and 14 from low to high; and the fourth level nodes are numbered 15, 16, 17, 18, 19, 20, 21, 22, 23, 24, 25, 26, 27, 28, 29 and 30 from low to high.

11. The method of claim 10, further comprising encoding slopes for the selected 3, 7 and 16 nodes with binary codes and extracting a multi-dimensional feature vector for the signal stream.

12. The method of claim 1, wherein the comparing step comprises using Hamming distance as a criteria in testing the wavelet-based signature against the database.

13. The method of claim 12, further comprising applying supplemental identification processing to the signal data to provide additional identification information for the signal stream where more than one signal source in the database has the same Hamming distance with respect to the signal stream.

14. The method of claim 12, further comprising identifying the signal source as a new signal source where the smallest Hamming distance is above a selected value.

15. A signal source identification system, comprising:
a phase pre-processing sub-system coupled to receive an individual input signal stream, the phase pre-processing sub-system being configured to determine phase differential data for the individual input signal stream, the input signal stream corresponding to signal data from a signal source of unknown identity;
a wavelet-based signal processing sub-system coupled to receive the phase differential data from the phase pre-processing sub-system, the wavelet-based signal processing sub-system being configured to apply wavelet packet processing to generate a signature for the individual input signal stream;
a database having stored data, the stored data including wavelet-based signatures corresponding to known signal sources, known signal sources being signal sources that have been previously identified; and
a signal source identification sub-system coupled to receive the signature from the wavelet-based signal processing sub-system, the signal source identification sub-system being configured to compare the signature for the input signal stream with the stored data and to determine if the individual input signal stream matches wavelet-based signatures of a known signal source in order to identify the input signal stream as being from a known signal source if a match is determined to be made, the signal source identification sub-system being further configured to output an indication of the identity of the signal source of the input signal stream.

16. The signal source identification system of claim 15, further comprising:
a data acquisition sub-system having data signals as an output, the data acquisition sub-system being configured to receive an input signal that includes combined signal streams from a plurality of signal sources; and
a data pre-processing sub-system coupled to receive the data signals from the data acquisition sub-system; the data pre-processing sub-system being configured to separate the data signals into a plurality individual signal streams, each individual signal stream being deemed to have originated from a single signal source, and being configured to provide one of the individual signal streams to the phase pre-processing sub-system.

17. The signal source identification system of claim 16, further comprising a supplemental identification sub-system coupled to receive data from the wavelet-based signal processing sub-system, the supplemental identification sub-system being configured to provide additional identification information for the individual input signal stream.

18. The signal source identification system of claim 17, wherein the supplemental identification sub-system comprises Fourier transform processing that generates spectral coefficients, the spectral coefficients providing additional signature information, and wherein the stored data in the database further includes spectral coefficient signatures corresponding to known signal sources.

19. The signal source identification system of claim 15, wherein the signal source identification sub-system is further configured to add signature data to the database if the individual input signal stream is not found to match signatures of known signal sources stored in the database.

20. The signal source identification system of claim 15, wherein the wavelet-based signal processing sub-system is configured to perform full wavelet packet decomposition into multiple levels to generate a plurality of decomposed nodes.

21. The signal source identification system of claim 20, wherein the wavelet-based signal processing sub-system is further configured to use wavelet coefficients for selected nodes in generating the wavelet-based signature.

22. The signal source identification system of claim method of claim 21, wherein the multiple levels is four levels.

23. The signal source identification system of claim 22, wherein nodes 3, 7 and 16 are selected for use in generating the wavelet-based signature, the node numbers representing a numbering scheme where the first level nodes are numbered 1 and 2 from low to high; where the second level nodes are numbered 3, 4, 5 and 6 from low to high; where the third level nodes are numbered 7, 8, 9, 10, 11, 12, 13 and 14 from low to high; and the fourth level nodes are numbered 15, 16, 17, 18, 19, 20, 21, 22, 23, 24, 25, 26, 27, 28, 29 and 30 from low to high.

24. The signal source identification system of claim 23, further comprising:
a data acquisition sub-system having data signals as an output, the data acquisition sub-system being configured to receive an input signal that includes combined signal streams from a plurality of signal sources; and
a data pre-processing sub-system coupled to receive the data signals from the data acquisition sub-system; the data pre-processing sub-system being configured to separate the data signals into a plurality individual signal streams, each individual signal stream being deemed to have originated from a single signal source, and being configured to provide one of the individual signal streams to the phase pre-processing sub-system.

* * * * *